United States Patent [19]

Schonfeld et al.

[11] Patent Number: 4,803,882

[45] Date of Patent: Feb. 14, 1989

[54] UNBALANCE MEASURING STATION AND METHOD FOR UNBALANCE MEASUREMENT

[75] Inventors: Harald Schonfeld, Darmstadt; Rainer Jarschel, Egelsbach; Helmut Frank, Dieburg, all of Fed. Rep. of Germany

[73] Assignee: Carl Schenck AG, Fed. Rep. of Germany

[21] Appl. No.: 66,335

[22] Filed: Jun. 25, 1987

[30] Foreign Application Priority Data

Nov. 8, 1986 [DE] Fed. Rep. of Germany ....... 3638158
Nov. 21, 1986 [EP] European Pat. Off. ........ 86116150.3

[51] Int. Cl.⁴ ..................... G01M 1/02; B65G 47/00
[52] U.S. Cl. ..................................... 73/462; 198/345; 414/222; 73/471
[58] Field of Search .................. 73/460, 462, 471–479; 414/222, 225, 751, 783; 198/345

[56] References Cited

U.S. PATENT DOCUMENTS

| | | | |
|---|---|---|---|
| 3,038,342 | 6/1962 | Hack | 73/462 |
| 3,148,546 | 9/1964 | Karig | 73/486 |
| 3,235,073 | 2/1966 | Kinsey et al. | |
| 3,236,995 | 2/1966 | Fibikar et al. | |
| 3,922,922 | 12/1975 | Goebel | 73/462 |
| 4,262,536 | 4/1981 | Orem et al. | 73/462 |
| 4,553,321 | 11/1985 | Zihlmann et al. | 29/598 |
| 4,718,533 | 1/1988 | Nussbaumer et al. | 414/222 |

*Primary Examiner*—John Chapman
*Attorney, Agent, or Firm*—Connolly and Hutz

[57] ABSTRACT

An unbalance measuring station (1) is disclosed toward which a rotor to be balanced is carried by a transport system (7). The station (1) contains an unbalance measurement unit (10) as well as devices (11, 12) for loading the rotor (6) into the unbalance measurement unit. The unit is essentially arranged above the plane of the path of movement of the transport system (7). The unbalance measuring station (1) is particularly suited for use in connection with transfer and assembly lines.

17 Claims, 2 Drawing Sheets

4,803,882

UNBALANCE MEASURING STATION AND METHOD FOR UNBALANCE MEASUREMENT

BACKGROUND OF THE INVENTION

The present invention relates to an unbalance measuring station where a rotor to be balanced is carried to the station by means of a transport system. The station consists of an unbalance measuring unit and means for the positioning and loading of the rotor in the measuring unit. The measuring unit includes structure for bearing the rotor, structure for rotating the rotor, measuring transducer structure that senses the unbalance of the rotor, a reference signal generator, and a data processing unit for processing the measured signal in combination with the reference signal and a method for measuring unbalance.

U.S. Pat. No. 3,235,073 describes conveying a rotor to be balanced by means of an essentially horizontally oriented transport device to an unbalance measuring station. At the station the unbalance to be corrected is determined so that the rotor may be balanced during subsequent processing. For transporting the rotor and for positioning same at the unbalance measuring station, a device is provided consisting of two parallel rods one on each side of the rotor that carry several pairs of fingers for support of the rotor. The rods are swiveled synchronously in a position where the fingers are horizontally oriented. As a result of lifting both rods, both fingers of a finger pair grip the rotor from underneath while the rotor is still outside the unbalance measuring station and support the rotor. Both rods now carry out a translatory movement through which the rotor is inserted into the unbalance measuring station and by lowering of the rotor, it is positioned on the bearing device of the measuring unit.

Next the rods are swiveled in a position so that the fingers point down, and this is followed by a translatory motion that returns the rods to their original position. In the succeeding work cycle the next following rotor is inserted while simultaneously the already measured rotor, utilizing a second pair of fingers, is transported out of the unbalance measuring station and is placed on a given spot determined by the translatory stroke of the rods. Use of the transport and positioning device as described necessitates that the rotors which are transported via a roll-conveyor are located singly and, in addition, must be brought in a precise starting position on the transport and positioning system of the unbalance measuring station. A transport and positioning system of this kind makes it impossible to unite the balancing facility in an overall concept of an assembly line with integrated transfer system. In addition, the complicated sequence of movements produces a difficult installation.

U.S. Pat. No. 3,236,995 discloses a balancing facility having two parallel rails inclined to the horizontal and on which the rotor rolls on its bearing journals, as a result of gravity. The rotor rolls away from its starting position toward the receiving end of the balancing station. At the receiving end, the rotor is stopped and then transported by means of a transport device to the measurement station. The transport between the individual stations of the balancing facility is carried out by means of a grip system that shuttles back and forth between end positions corresponding to station distances. This arrangement is also complicated and cannot be used in a simple transfer system.

SUMMARY OF THE INVENTION

Starting with the above as the state of the prior art, it is an object of the present invention to simplify the positioning of the rotor in the balancing station and to create a simple unbalance measuring station utilized in a simple and uncomplex transfer system without complicated adaptations.

In accordance with the present invention, the transport system is preferably horizontally arranged and such transport system passes through the unbalance measuring station. The unbalance measuring unit is located essentially above the plane of the path of movement of the transport system. In an advantageous manner, a separate transport system for the unbalance measuring station is no longer needed, since the rotor passes through the measuring station as it is already positioned on the transport device of the transfer system. According to the invention, the rotor is directly accessible to the unbalance measuring unit, and the unit together with those parts that are related to the rotor are located above the plane of the path of movement of the transport system. Parts related to the rotor include the bearing device, means for rotation, one or several measuring transducers and in case of need a unit for the creation of the reference signal. There is no need for repositioning devices since access is direct.

The unbalance measuring station may, for instance, reach around, portal like, a step by step advancing transfer system, preferably a conveyor belt or conveyor chain that carries rotors. It is also possible to provide an unbalance measuring unit to the side of the transport and/or transfer system or to the side of the middle of it. The transport system may be in the configuration of a translatory or a circular system. The transport direction or system may be arranged at any suitable angle toward the horizontal plane, especially also at a normal angle to the horizontal plane or it may be located in a horizontal plane. The transfer device or devices can also be of curved design. In this latter case, the plane in which the path of movement of the transport device lies encompasses, for instance, part of the area of a cylindrical body.

In an advantageous embodiment of the present invention, it is provided that the transport system is arranged essentially horizontally and the unbalance measuring unit is above the plane of the path of movement of the rotors. The path of movement of the rotor is limited by the contour of the rotor as it moves with the transport system in the direction of transport. This embodiment proves advantageous because the transport/transfer device which runs through the total assembly line can be arranged in an essentially horizontal plane.

An unbalance measuring station of small lateral dimensions can be achieved by position an upside down arranged unbalance measuring unit essentially vertical above a spot of the essentially horizontally oriented path of movement of the rotors.

Especially advantageous is an embodiment of the invention wherein the transport device possesses a rotor carrier in the form of transport pallets. In those cases of belt or chain transport of the pallets, control of branching of the piece flow is easily accomplished by simple means. It is also possible to guide different rotors supported by advantageously dimensionally alike transport pallets toward the unbalance measuring unit. Further-more, self propelled transport pallets may also be used which is especially advantageous for larger rotors. The self propelling system of the transport pallets can be controlled in such a form that the pallet comes to rest in an exact predetermined position, for instance underneath or opposite the unbalance measuring unit.

Another advantageous embodiment of the invention provides a magnetic field system for the rotation of the rotor and/or for loading of the rotor in the bearing device.

The magnetic field system may be used for complete control of the rotation of the rotor, i.e., for its acceleration, for operation at constant speed and for braking. With reference to loading the rotor into the bearing device, the magnetic field system serves the purpose of moving the rotor into a position in which the rotor rests against the bearing device. A modification which allows a magnetic field system to create a rotating field and/or a direct current (D.C.) field, offers an advantage in those cases of an open rotating field with respect to loading the rotor into the bearing device. Because the rotor, besides being rotated by tangential forces, is also pulled upward into the field by radial forces, a secure positioning in the bearings is insured despite downward gravitational forces. There is no need to arrange additional supports beneath the rotor after positioning same. The bearing devices in this case may advantageously be either roller bearings or friction bearings or they may be suitable for accepting the service bearings of the rotor.

A further embodiment of the invention provides that the transport occurs step-by-step and that the distance between of the loading lift whereby the rotor may still rest on a *lifted* lift device, is smaller than at the end of transport step. The total loading lift can thus advantageously be divided into one first increment namely the lift from transport position to a near position and a second smaller increment from near to loading position. This is especially advantageous when the rotor is loaded into the bearing device by means of a magnetic field because the small gap between bearing device and rotor makes even a small magnetic system sufficiently strong. It may be expedient to provide adjustment of the gap or a lift device for loading the rotor into the bearing device.

Alternatively or additionally a lowering device for adjustment of the gap or easier loading of the rotor may be provided for the unbalance measuring unit or at least part thereof.

The lifting device may carry out the total loading lift, but it can also be provided that the loading lift is divided into a lift device and lowering device.

In keeping with a further development of the invention toward simple construction, it is provided that the rotational axis of the rotor is horizontal.

Mechanical means are purposefully provided such as belt drives, hydraulic drives or roller drives to accomplish rotation of the rotor and counter rollers may also be used to act in union with the support rollers.

Advantageous is also an embodiment wherein the axis of rotation of an essentially disc like rotor is vertically positioned. The unbalance measuring unit possesses a simple bearing device in the form of a vertical spindle which as a rotatable spindle simultaneously causes the rotation of the rotor.

In a further modification of the invention, the unbalance measuring station is part of a balancing facility which surrounds, portal like, the path of movement of the rotor with measuring and/or correction stations.

A most simple loading of the rotor in its bearing device results from the use of a method for measuring the unbalance of a rotor to be balanced in an unbalance measuring unit which essentially comprises a bearing device for the rotor, means to rotate the rotor, a measuring transducer that determines the unbalance of the rotor, a reference signal generator and a data processing unit for processing the measured signal in combination with the reference signal. The method is distinguished in that the unbalance measuring unit is first arranged in such a manner that the unit is located essentially above the rotor and that the rotor is being lifted and held in place by the unbalance measuring station. The magnetic field system of the station can thereby provide the rotation of the rotor and/or the loading action into bearings including holding of the rotor. A simple embodiment of an unbalance measuring station according to the invention, can be incorporated without extensive adaptation in a transfer system which may be part of a total assembly line.

BRIEF DESCRIPTION OF THE DRAWINGS

Novel features and advantages of the present invention in addition to those mentioned above will become apparent to those of ordinary skill in the art from a reading of the following detailed description in conjunction with the accompanying drawing wherein similar reference characters refer to similar parts and in which.

DETAILED DESCRIPTION OF THE INVENTION

Figure 1:
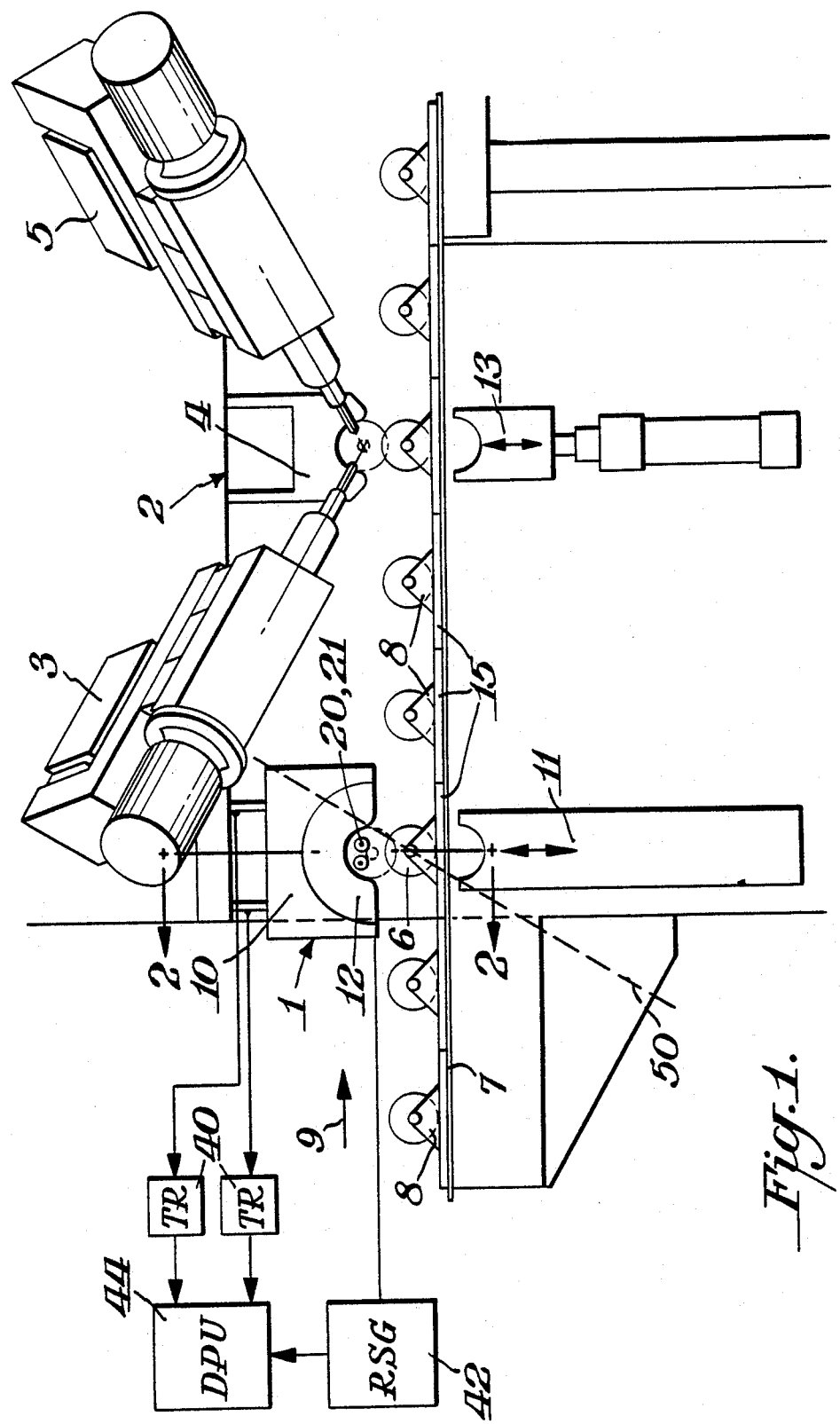
FIG. 1 is a side elevational view of a rotor balancing facility according to the present invention.

Referring in more particularity to the drawing, FIG. 1 schematically illustrates an unbalance measuring station as part of a balancing facility. Connected with and following station 1 is a correction station 2 with means 3 and 5 for respectively removing and/or adding material at appropriate correction points on the rotor 6 to be balanced. The rotors 6 that are to be measured and/or to be balanced are transported toward station 1 by means of a longitudinal and horizontally oriented transfer line illustrated as transfer belt 7. The rotors pass through unbalance measuring station 1 and finally reach correction station 2.

The transfer belt 7 is equipped with equidistance rotor carriers 8 that fix the rotor 6 in the horizontal direction of transport as defined by the arrow 9 in FIG. 1 as well as in orthogonal direction, i.e. the direction of its rotational axis which is transverse to the direction of transport and is also horizontal. The transfer belt 7 is transporting the rotors 6 in a horizontal plane, step by step, with a step length that corresponds to the rotor carrier 8 spacing on the transfer belt 7. The transfer belt 7 and the rotor carriers 8 pass through the balancing facility which includes measuring station 1 and correction station 2. After the correction station 2, a further unbalance measuring station similar to station 1 may be provided if needed in order to test the quality of the achieved balance and/or to determine any residual unbalance. In this case the transfer belt 7 also passes through the additional unbalance measuring station.

One transfer step delivers the rotor 6 into the unbalance measuring station 1 and the rotor is positioned at the end of the transfer step in alignment with unbalance measuring unit 10 and the lift device 11. The unbalance measuring unit 10 comprises a bearing device for the rotor 6 (not shown in detail), means for rotating the rotor 6 which in the depicted embodiment consists of an open magnetic field system 12 with which a rotating field can be created, two measuring transducers 40 that sense the unbalance action, a reference signal generator 42 as well as a data processing unit 44 that determines the unbalance based on the measurement signal and the reference signal. The construction and function of such an unbalance measuring facility for rotors with distinct poles may be deduced in principle as well as in the form of the examples discussed in U.S. Pat. No. 3,038,342, the disclosure of which is incorporated herein by reference.

The essence of unbalance measuring unit 10, i.e. the parts that cooperate with the rotor 6 such as bearing device, magnetic field system 12, measurement transducers 40, and reference signal generator 42, may be positioned above the path of movement of the rotors 6. The centers of at least the bearing device and the magnetic field system may lie in a vertical plane defined by the rotor axis of a stationary rotor after completion of the transfer step to the measuring unit.

The bearing device for the rotor 6 may utilize sets of support rollers (not shown) that fit the rotor shaft ends. The opening of the open magnetic field 12 is pointing toward the rotor 6 and, in the case where a rotor 6 is loaded into the bearing device from below such opening encompasses at least a semi-circular portion of the rotor 6 and the distinct poles thereof. The result of using an open rotating field is that aside from tangential forces for rotation, radial forces also act upon the rotor 6 to thereby pull the rotor 6 into the field and thereby into the bearing device against the force of gravity.

The lifting device 11 is located below the path of movement of the rotor carrier 8 and the transfer belt 7, in a vertical plane that includes the axis of the stationary rotor 6. The lifting device 11 is elevated from its resting position in the direction of the bearing device. Device 11 contacts the rotor 6 and lifts it off the rotor carrier 8 for the purpose of loading the rotor 6 into the corresponding bearing device. The vertical lift is terminated when the rotor 6 is in close proximity to the support rollers of the bearing device.

The completion of the lift for loading the rotor, i.e. when the journals of the rotor 6 contact the support rollers, is accomplished by a magnetic field that acts upon the rotor 6 which field is either a direct current field during the lift operation or the field may contain a large D.C. field component. In this case, the magnetic field system 12 is designed to create a rotating and a D.C. field during lifting and during the measuring run. Under certain conditions the loading can also be accomplished by means of an open rotating field alone. Because the rotor 6 is brought in close proximity to the bearing device by means of the lift device 11, the magnetic field system can be held compact.

After completion of the measuring run, the rotor 6 is lowered upon the lift device 11 which is downwardly shifted to its resting position causing the rotor 6 to be repositioned upon the rotor carrier 8. The next transfer step moves the rotor 6 toward the correction station 2 while simultaneously moving the next rotor on the transfer belt to unbalance measuring station 1.

Correction station 2 comprises a holding device in addition to the components 3 and 5. The holding device includes an element 13 which in its resting position is located below the path of movement of rotor carrier 8 and the transfer belt 7. Element 13 cooperates with a stopping block 4 located above the path of motion of the belt and carriers. After the transfer belt 7 comes to a stop, the holding element 13 is moved toward the stopping block 4 so that finally the rotor 6 that is to be balanced, is carried along with the holding element 13 and is ultimately clamped between element 13 and block 4. The correction procedure is carried out in response to the information determined at station 1, and after such correction has been completed, the holding element is moved back to its resting position whereby the rotor 6 comes to rest upon the rotor carrier 8. The next transfer step then takes place. In cases where the duration of the two procedures (measurement procedure and correction procedure) are different, the cycle time for the transfer belt 7 is determined by the more time consuming procedure.

It is within the scope of the present invention that because of space limitations a rearrangement is possible whereby instead of the arrangement shown in FIG. 1 where the lift device 11 and unbalance measuring unit 10 lie in a vertical plane other arrangements may be used. A plane 50 inclined to the vertical may be employed. This is indicated in FIG. 1 by the dashed line through the center of the rotor. In this case the axis of the unbalance measuring unit 10 is shifted in the transport direction with respect to the rotor axis of the stationary rotor 6, and both the unit 10 and the lift device 11 are arranged in the inclined plane. The movement of the lifting device 11 takes place in the direction of dashed line 50.

Further, it is within the scope of the invention to orient the horizontally disposed rotor axes parallel to the direction of transport. The unbalance measuring unit 10 and the lift device 11 may also be rearranged to align with the rotor axis. If the rotors 6 are placed centrally upon the transport device 7, unit 10 and lift device 11 are positioned to the side of the transport device 7 or to the side of the center of the transport device 7 as viewed in the transport direction.

Figure 2:
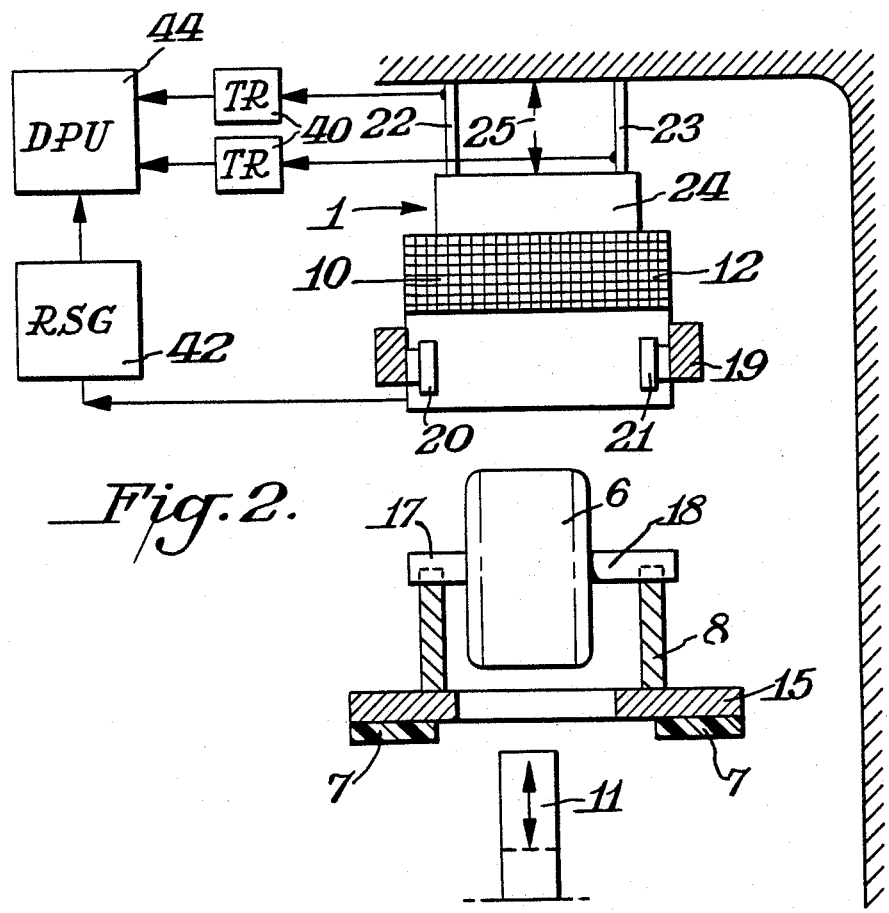
FIG. 2 is a sectional view generally taken along line 2—2 of FIG. 1 but illustrating transport pallets as rotor carriers.

FIG. 2 shows the unbalance measuring station 1 toward which rotors 6 to be measured are carried by means of a horizontally arranged transfer belt 7. In the depicted embodiment, each rotor 6 is supported by a rotor carrier 8 in the form of a transfer pallet 15. The transfer pallets 15 are supported by the transfer belt 7. Such pallets are taken along in the direction of the transfer belt 7. The transfer pallets 15 pass through measuring station 1 and if necessary additional stations of a balance facility such as correction station and second measuring station.

The rotor has journals 17, 18 (shaft ends) with which the rotor can be loaded is the bearing device 19 of the unit 10, the bearing device having the form of support roller sets 20, 21. The rotor axes and the axis of the bearing device 19 are horizontal and transverse to the direction of movement of the transport pallet 15.

The unbalance measuring unit 10 comprises the magnetic field system 12, the support roller sets 20, 21, and a bridge 24 suspended by means of springs 22, 23 from stationary parts of the measuring station. The vibrations of the unit are picked up by vibration transducers 40.

Design and function of unit 10 and lift device 11, together with their cooperative function with the transfer belt 7 is explained in more detail above in connection with FIG. 1. As explained above, the rotor axis may also be arranged parallel to the direction of movement of transport pallet 15, or in other words, parallel to the transport device 7. Further, as explained above, unit 10 and lift device 11 may be located in an inclined plane through the rotor axis.

If desirable, the step of loading the rotor 6 into the bearing device 19 may be accomplished by raising lifting device 11 and also by lowering unit 10. Also, lowering unit 10 may be used without any elevation of the rotor. This latter possibility of movement is indicated by dashed arrow 25 in FIG. 2. If only the unit 10 is moved, then the unit during the lowering phase comes to rest a short distance away from rotor 6 which then will be lifted magnetically from the transport pallet 15 so that an unrestricted measuring run is possible.

Figure 3:
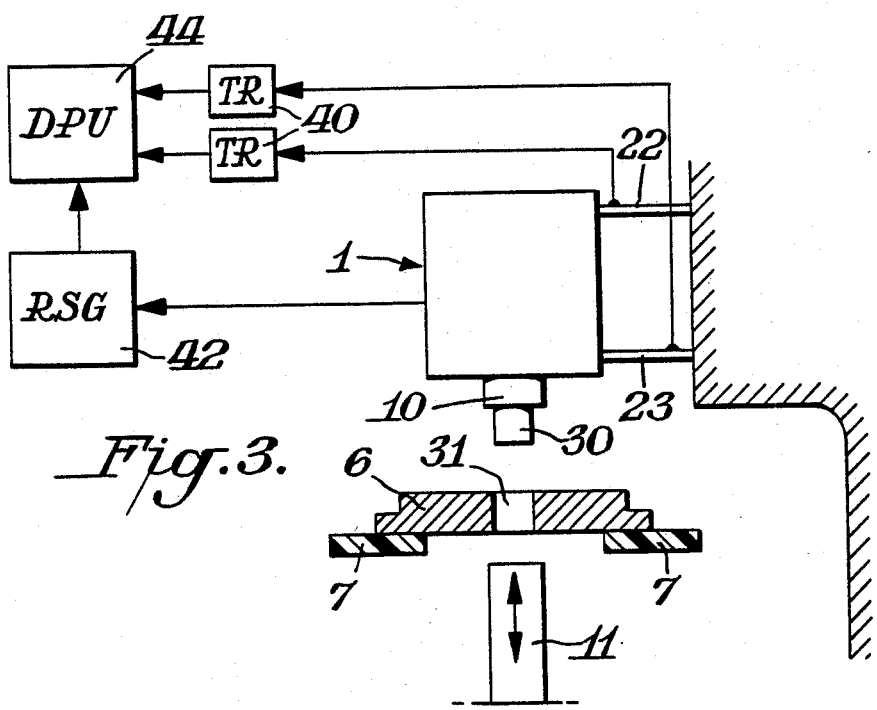
FIG. 3 is a view similar to FIG. 2 but illustrating disc-type rotors.

The unbalance measuring station shown in FIG. 3 is generally arranged like the previously described stations. However, the station of FIG. 3 is designed to accommodate a vertical rotor axis and is therefore most suitable for unbalance measurement in disc shaped rotors 6 without journals. The rotors 6 are supported by the horizontally arranged transfer belt 7 without the use of an intermediate rotor carrier. Unit 10 of FIG. 3 has a bearing device in the form of vertically arranged spindle 30 upon which the rotor 6 with its central bore hole 31 is installed. Such is accomplished by means of device 11 and/or through lowering of the unit 10. Rotor 6 is so held by mechanical means during the measuring run. The spindle 30 is rotatably driven by an electric motor or by fluidic means such as compressed air. Other means, usually employed with balancing machines, may also be used. The same is also true for the corresponding component parts of the other embodiments noted above.

While all the aforementioned embodiments include transfer system 7 arranged in a horizontal plane, other arrangements may be used, for example, a transfer system at an angle to the horizontal plane. In this case the components that cooperate with the transfer system 7 preferably retain their positions relative the transfer system.

What is claimed is:

1. In an unbalance measuring station toward which a rotor to be balanced is carried by a transport system, the station having an unbalance measuring unit and a device for loading a rotor into engagement with the measuring unit, hearings for the rotor, means for rotating the rotor, a measurement transducer for sensing effects of the unbalance of the rotor, a reference signal generator and a data processing unit for processing the measured signal in combination with the reference signal, the improvement according to which the transport system is arranged in a line passing through the unbalance measuring station, and the measuring unit being located above the path of movement of the transport system and having a loading side facing the transport system.

2. The combination of claim 1 wherein the transport system is horizontally arranged.

3. The combination of claim 1 wherein the path of movement of the rotor is planar.

4. The combination of claim 1 wherein the unbalance measuring unit is arranged vertically above a spot of the horizontal path of movement of the rotor.

5. The combination of claim 1 wherein the transport system includes a rotor carrier in the form of a transport pallet.

6. The combination of claim 1 wherein the means for rotating the rotor and/or for loading of the rotor in the bearing is a magnetic field system.

7. The combination of claim 6 wherein the magnetic field system creates a rotating field or a D.C. field.

8. The combination of claim 6 wherein the magnetic field system creates a rotating filed and a D.C. field.

9. The combination of claim 1 wherein the transport system is constructed and arranged to transport the rotor in step-by-step fashion.

10. The combination of claim 1 including a lifting device for elevating the rotor from the transport system.

11. The combination of claim 1 including a lowering device constructed and arranged to lower at least the bearings of the unbalanced measuring unit.

12. The combination of claim 1 including a lifting device for elevating the rotor from the transport system and a lowering device for lowering at least the bearings of the balancing unit.

13. The combination of claim 1 wherein the axis of rotation of the rotor is horizontal.

14. The combination of claim I wherein the bearings includes support rollers.

15. The combination of claim 1 wherein the rotor to be balanced is disc shaped having a vertical axis of rotation, and the unbalance measuring unit includes bearings in the form of a vertical spindle.

16. The combination of claim 1 including a measurement and correction station in the path of movement of the transport system.

17. A method of measuring the unbalance of a rotor comprising the steps of providing an unbalance measuring station having an unbalance measuring unit and a device for loading a rotor in the measuring unit, transporting a plurality of spaced apart rotors along a line passing through the unbalanced measuring station, locating the unbalance measuring unit above the path of travel of the rotors and arranging the loading side thereof facing a rotor to be balanced, lifting the rotor to be balanced into engagement with the unbalance measuring unit, and determining the unbalance of the rotor.

* * * * *